July 26, 1960
H. KLAASSEN ET AL
2,946,317
ADJUSTING MECHANISM FOR ADJUSTING THE PITCH
OF THE BLADES OF A MARINE PROPELLER
Filed Nov. 4, 1957
2 Sheets-Sheet 2
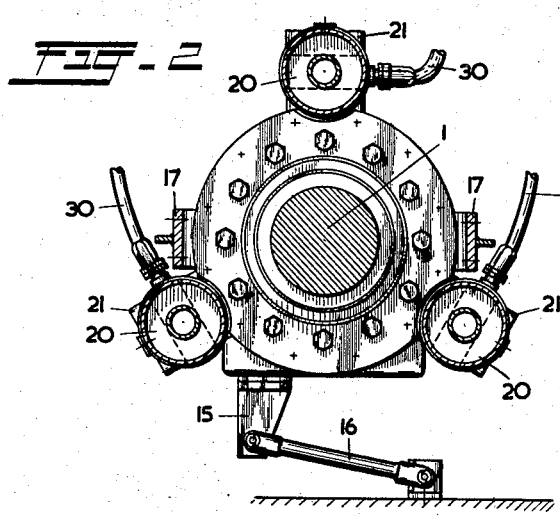
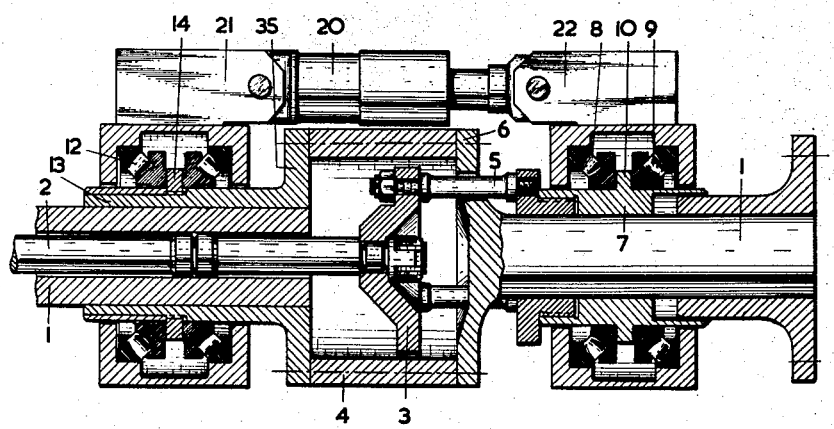
INVENTORS
HENDRIK KLAASSEN
WILLEM DAANE
BY
Irwin S. Thompson
ATTORNEY

United States Patent Office 2,946,317
Patented July 26, 1960

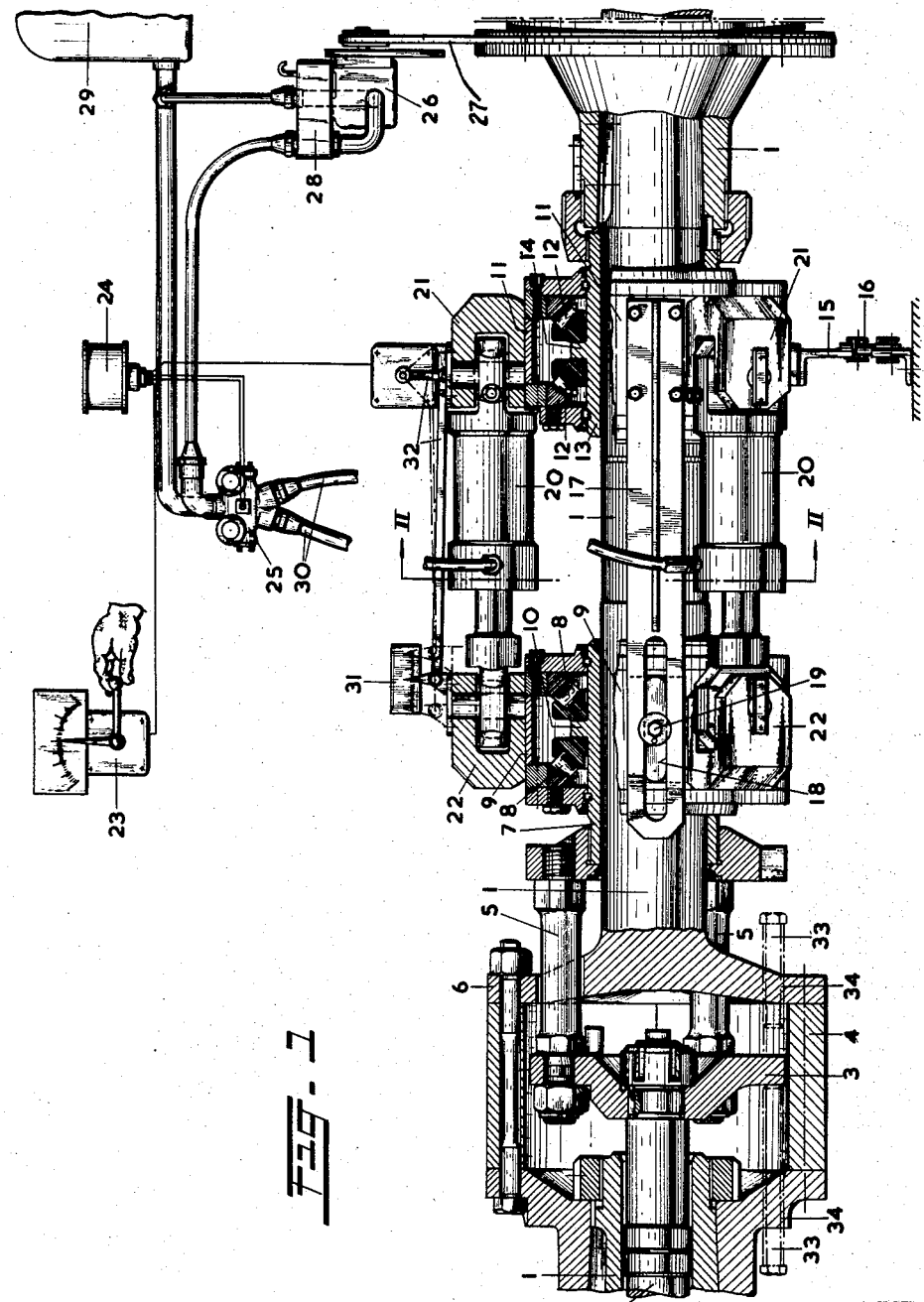

2,946,317

ADJUSTING MECHANISM FOR ADJUSTING THE PITCH OF THE BLADES OF A MARINE PROPELLER

Hendrik Klaassen, Drunen, and Willem Daane, Vlijmen, Netherlands, assignors to Lips N.V., Drunen, Netherlands, a corporation of the Netherlands Filed Nov. 4, 1957, Ser. No. 694,195

Claims priority, application Netherlands Nov. 7, 1956

8 Claims. (Cl. 121—38)

The invention relates to an adjusting mechanism for adjusting the pitch of the blades of a marine propeller, comprising a non-corotating servomotor for the adjustment, fitted externally of the propeller shaft and acting on a ring which is axially movable along the shaft but does not follow the rotation of the shaft, said ring transmitting its axial movements to a structure following the rotation of the shaft and comprising an adjusting rod passing through the hollow propeller shaft, pushing off from a ring surrounding the shaft, which is axially immovable relative to the propeller shaft.

An adjusting mechanism of a similar type is known, in which the piston and the cylinder of the servomotor have the form of annular elements concentrically surrounding the continuous propeller shaft.

This has the drawback that repairs on the servomotor are difficult and can hardly be performed, if at all, while the propeller shaft is rotating, while disassembly and replacement of the servomotor and renewal and inspection of the piston seals can only be effected by a drastic removal of components, including even a part of the propeller shaft. The piston moreover has an additional seal along the inner circumference, which increases the risk of leakage and adds to the above mentioned drawbacks with regard to repairs, overhaul, and replacement.

Moreover the risk is great that the movable collar thrust bearing in the said structure has to take up asymmetrical forces owing to difference in length of the connecting parts between collar thrust bearing and piston.

The invention has for its object to improve this known apparatus, and to achieve this an apparatus as referred to in the preamble is characterized according to the invention in that the servomotor comprises two or more servomotor units, which are evenly distributed along the circumference of the shaft and are fitted around this shaft.

In this way it is possible to use for the construction of the servomotor normal units which are commercially available in standard types. Further these units can easily be repaired and replaced even during the rotation of the propeller shaft. It is further easier with such units to employ high pressures of the medium. In consequence, transmission elements for increasing the forces can be dispensed with. The whole construction thus remains simple and reliable.

The axis of each servomotor unit is preferably parallel to the axis of the propeller shaft.

The invention will now be elucidated more fully with reference to the annexed drawing, which illustrates two embodiments of an adjusting mechanism according to the invention by way of example only, Fig. 1 shows a mechanism according to the invention, partly in axial and vertical cross-section, partly in side-elevation, viewed from aside in the direction of the propeller shaft.

Fig. 2 is a transverse section along the line II—II in Fig. 1.

Fig. 3 is a side-elevation and partly an axial cross-section of a second embodiment of the invention.

In the embodiment according to Figs. 1 and 2 the part of the propeller shaft 1 closest to the propeller, i.e. on the left-hand side of the figure, surrounds an adjusting or control rod 2 passing centrally through it. This rod at the inner end (within the ship) carries a yoke 3, accommodated inside a casing-like part 4 of the propeller shaft. Connecting rods 5 extend from the yoke 3 through a flange 6 of the part of the propeller shaft lying further inwards, and these connecting rods 5 are firmly connected with a ring or sleeve 7 surrounding said propeller shaft. This ring 7, in conjunction with the adjusting rod 2, the yoke 3, and the connecting rods 5, naturally follows the rotation of the propeller shaft, but is axially movable relative to said shaft. By means of conical roller bearings 8 or other suitable thrust bearings the ring 7 is rotatable inside a non-rotating ring 9. The axial locking of the ring 7 and 9 is brought about by a locking flange or collar 10 on the outside about the central part of the ring 7.

Situated at some distance from the ring 9 is a similar ring 11, inside which by means of conical roller bearings 12 or other thrust bearings a ring or sleeve 13 is rotatable, which is firmly connected to the propeller shaft 1, so that it cannot rotate or move relative to the latter. This ring 13 has a locking flange or collar 14 for the axial locking of the rings 11 and 13. The ring 11 is locked against rotation with the propeller shaft 1 by means of a projecting arm 15, which by means of a rod 16 and pivotal connections enclosed in elastic bearings, e.g. of rubber (silent blocks) connects said ring to a fixed point of the ship. The elastic connections permit a slight amount of movement in all directions, including the axial direction, while no vibrations are transmitted. One or more guiding strips 17 have been welded to the ring 11 and have slots 18, in which a guiding member 19 connected to the ring 9 is adapted to move axially along with said ring 9. In this way the rings 9 and 11 always keep the same circumferential position. Between the rings 9 and 11 there are two or more servomotors 20 (three in the embodiment of the drawing), in the form of simple cylinders with pistons, regularly distributed over the circumference and of a standard construction, as normally commercially available. Both the cylinder and the piston rod of each servomotor have a pivotal connection 21 and 22 respectively with the ring 11 and the ring 9 respectively. With small angular rotations between the rings 9 and 11 therefore no jamming can occur. The cylinders act uniformly upon the two rings owing to their being regularly distributed over the circumference and in view of their joint hydraulic supply, which will be described in more detail below.

This adjusting mechanism is operated electrically by a switch 23. This feeds an electric current impulse to a relay 24, which operates electrically a valve 25 for the hydraulic medium of the servomotors.

An oil pump 26 is driven by a belt or chain 27 from the propeller shaft. Situated above this pump is an oil tank 28. The pump 26 communicates with an accumulator tank 29 and supplies the electrically operated valve 25. From said valve, flexible tubes 30 pass to the servomotor units, viz. two tubes to each unit, one to each side of the piston in the latter. An indicator 31 indicates the angle of adjustment. This has e.g. a pointer which has been fitted to the ring 9 and consequently indicates the axial position of the latter on a graduated scale, which is connected axially with the ring 11. A follow-up mechanism 32 electrically readjusts the valve 25. It is naturally also possible to provide for a mechanical operation of the valve 25.

A locking device may be provided in order to lock the adjusting rod 2 in the axial position from the outside. For this purpose bolts 33 are shown in broken lines in the drawing, which bolts can be screwed in through threaded openings 34 in the casing 4. After this locking has been brought about, the servomotor units can without difficulty be disassembled, replaced, etc. even while the propeller shaft is rotating. When the pivoting pins in the connections 21 and 22 are removed, each servomotor unit can be taken away in its entirety. Upon damage to the adjusting mechanism, e.g. owing to acts of war, the adjusting rod can be locked by means of these bolts in the desired position in order that the ship may pursue its course in the normal way.

The force of adjustment and the force of reaction are taken up in the shaft itself, without any transmission through the ship itself. There are no rotating oil seals on the shaft for the introduction of the high-pressure oil.

In the embodiment according to Fig. 3 a much shorter structure is obtained than in the embodiment of Figures 1 and 2. The same parts are indicated with the same reference numerals as in Figures 1 and 2. The casing-like part 4 of the propeller shaft, which accommodates the yoke 3, has been fitted here between the rings 9 and 11. Since these rings always have to be at a certain distance from each other in connection with the length of the servomotor cylinders 20, owing to this position of the casing-like part 4 the distance between the rings 9 and 11 becomes only very slightly larger, if at all, than is necessary in connection with said cylinders 20.

In this case the ring or sleeve 13 is preferably provided with a projecting flange 35, which limits the casing-like part 4 of the propeller shaft on the side of the propeller, in consequence of which a compact structure is further promoted and the part of the propeller shaft situated inside said part 4 can dispense with such a flange, a circumstance which facilitates manufacture.

In Fig. 3 the length of the mechanism has been reduced to almost one-half the length that is necessary when the ring 11 is fitted on the side of the ring 9 opposite to that on which the casing-like part 4 is situated, as shown in Figures 1 and 2. The radial external dimension at most is increased only very little.

What we claim is:

1. Apparatus for adjusting the pitch of the blades of a propeller comprising a hollow propeller shaft, a first ring journalled on said propeller shaft and axially movable with respect thereto, a control rod within said hollow propeller shaft and axially movable with respect thereto, means connecting said first ring and said control rod for conjoint axial movement relative to said propeller shaft, a second ring surrounding said propeller shaft, means for securing said second ring to said propeller shaft to prevent relative axial movement therebetween, and a plurality of servomotors extending between and operatively connected to said two rings and equally placed about the axis of said propeller shaft, whereby when said servomotors are actuated to change the pitch of the propeller blades, reaction forces will be transmitted through said first ring to said control rod and whereby said first ring will move with the propeller shaft as it expands and contracts.

2. The apparatus of claim 1, the axis of each servomotor being parallel to the axis of the propeller shaft.

3. The apparatus of claim 2, each servomotor having a piston pivotally connected to the first ring and a cylinder connected to the second ring.

4. The apparatus of claim 1, said means connecting said first ring and said control rod lying between said two rings.

5. The apparatus of claim 4, said propeller shaft comprising an enlarged casing-like part, said means connecting said first ring to said rod comprising a yoke connected to said rod and within said part, connecting rods secured to said yoke and passing through said part, said connecting rods being connected to a second ring rotatable with and axially movable on the propeller shaft, means journalling said last-mentioned ring within said first ring for conjoint axial movement, and said second ring having a flange thereon to axially lock said rings.

6. The apparatus of claim 1, and mechanical locking means for locking said control rod against axial movement.

7. The apparatus of claim 6, said locking means comprising a widened and hollow part of said propeller shaft, a yoke within said part, and bolts screw threaded into said hollow part, extending axially of said propeller shaft, and engageable with said yoke.

8. The apparatus of claim 1, and means for preventing rotation of one of said rings while permitting limited axial movement thereof.

References Cited in the file of this patent

UNITED STATES PATENTS

| | | |
|---|---|---|
| 1,047,999 | Shillinger | Dec. 24, 1912 |
| 2,357,914 | Stepanoff | Sept. 12, 1944 |
| 2,377,633 | Kettering | June 5, 1945 |
| 2,671,518 | Almen | Mar. 9, 1954 |